United States Patent
Sekizaki et al.

(10) Patent No.: US 10,106,037 B2
(45) Date of Patent: Oct. 23, 2018

(54) BATTERY CONTROL DEVICE

(71) Applicants: YAZAKI CORPORATION, Tokyo (JP); GS YUASA INTERNATIONAL LTD., Kyoto-shi, Kyoto (JP)

(72) Inventors: Masashi Sekizaki, Shizuoka (JP); Michito Enomoto, Shizuoka (JP); Takeyuki Shiraishi, Kyoto (JP); Takeshi Itagaki, Kyoto (JP)

(73) Assignees: YAZAKI CORPORATION, Minato-ku, Tokyo (JP); GS YUASA INTERNATIONAL LTD., Kyoto-shi, Kyoto (JP)

( * ) Notice: Subject to any disclaimer, the term of this patent is extended or adjusted under 35 U.S.C. 154(b) by 192 days.

(21) Appl. No.: 15/052,944

(22) Filed: Feb. 25, 2016

(65) Prior Publication Data

US 2016/0167520 A1    Jun. 16, 2016

Related U.S. Application Data

(63) Continuation of application No. PCT/JP2014/072441, filed on Aug. 27, 2014.

(30) Foreign Application Priority Data

Aug. 28, 2013  (JP) ................................. 2013-176359

(51) Int. Cl.
*B60L 3/00* (2006.01)
*B60L 1/00* (2006.01)
(Continued)

(52) U.S. Cl.
CPC ............. *B60L 3/0046* (2013.01); *B60L 1/003* (2013.01); *B60L 3/0038* (2013.01); *B60L 3/12* (2013.01);
(Continued)

(58) Field of Classification Search
CPC ...... B60L 3/0038; B60L 1/003; B60L 3/0046; B60L 3/12; B60L 11/1861;
(Continued)

(56) References Cited

U.S. PATENT DOCUMENTS

2005/0110460 A1* 5/2005 Arai ...................... B60L 3/0046
320/116
2006/0086981 A1   4/2006 Yamaguchi et al.
(Continued)

FOREIGN PATENT DOCUMENTS

CN      102944844 A      2/2013
CN      104507756 A      4/2015
(Continued)

OTHER PUBLICATIONS

Communication dated Mar. 21, 2017 from the State Intellectual Property Office of the P.R.C. in counterpart application No. 201480047466.5.
(Continued)

*Primary Examiner* — Mussa A Shaawat
(74) *Attorney, Agent, or Firm* — Sughrue Mion, PLLC

(57) ABSTRACT

In a self-diagnostic processing performed by a CPU, whether a vehicle is in an idle stop state is determined based on obtained vehicle operation information and engine operation information in order to perform abnormality detection processing. When an engine has stopped in a vehicle equipped with an idle stop function, electric power is supplied to electrical components of the vehicle, which means a battery supplies currents to the electrical components. Consequently, if a current measurement result obtained by measuring a current while the vehicle is stationary and an ignition is ON indicates that the measurement value is equal to or below a prescribed current value, the CPU determines that an abnormality has occurred in a measuring system.

5 Claims, 4 Drawing Sheets

(51) Int. Cl.
  *B60L 11/18* (2006.01)
  *B60L 3/12* (2006.01)
  *B60W 20/50* (2016.01)
  *H01M 10/48* (2006.01)
  *H01M 10/44* (2006.01)

(52) U.S. Cl.
  CPC .......... *B60L 11/1861* (2013.01); *B60W 20/50* (2013.01); *H01M 10/48* (2013.01); *B60L 2240/441* (2013.01); *B60L 2240/549* (2013.01); *B60L 2260/22* (2013.01); *B60W 2400/00* (2013.01); *H01M 10/44* (2013.01); *H01M 2220/20* (2013.01); *Y10S 903/907* (2013.01)

(58) Field of Classification Search
  CPC ......... B60L 2240/441; B60L 2240/549; B60L 2260/22; H01M 10/48; H01M 10/44; H01M 2220/20
  See application file for complete search history.

(56) References Cited

U.S. PATENT DOCUMENTS

2013/0338871 A1* 12/2013 Kubo ................. G01R 31/3606
                                                    701/29.2
2014/0159908 A1*  6/2014 Hong .................... G01R 31/025
                                                    340/636.1
2015/0175103 A1   6/2015 Yamazaki
2015/0303729 A1* 10/2015 Kasai ..................... H01M 10/42
                                                    320/134

FOREIGN PATENT DOCUMENTS

| | | | |
|---|---|---|---|
| JP | 2005-253283 | A | 9/2005 |
| JP | 2006-121834 | A | 5/2006 |
| JP | 2010-200574 | A | 9/2010 |
| JP | 2011-31822  | A | 2/2011 |
| JP | 2011-160613 | A | 8/2011 |

OTHER PUBLICATIONS

International Search Report for PCT/JP2014/072441 dated Dec. 9, 2014.
Communication dated Sep. 19, 2017 from the Japanese Patent Office in counterpart Application No. 2013-176359.
Communication dated Oct. 10, 2017 from the State Intellectual Property Office of the P.R.C. in counterpart Application No. 201480047466.5.
Communication dated Dec. 18, 2017 from the Korean Intellectual Property Office in counterpart Korean application No. 10-2016-7005178.
Communication dated May 8, 2018, from the Japanese Patent Office in counterpart application No. 2013-176359.

* cited by examiner

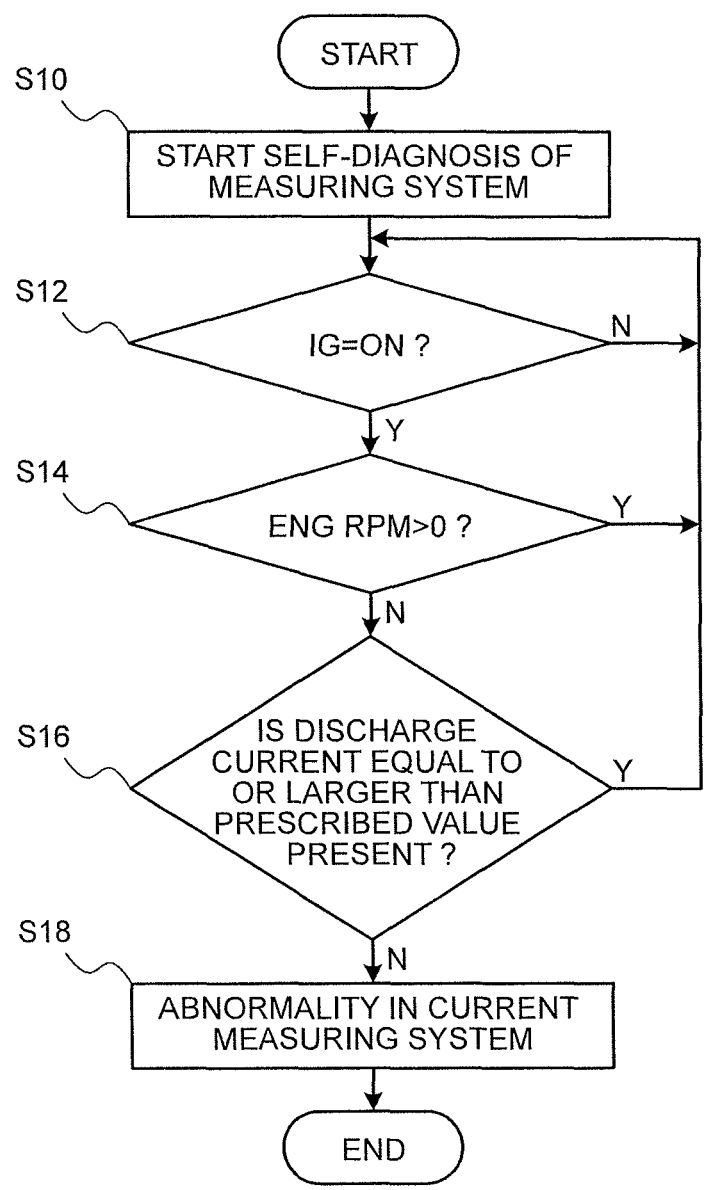

BATTERY CONTROL DEVICE

CROSS-REFERENCE TO RELATED APPLICATION

This application is a continuation application of International Application PCT/JP2014/072441, filed on Aug. 27, 2014, and designating the U.S., the entire contents of which are incorporated herein by reference.

BACKGROUND OF THE INVENTION

1. Field of the Invention

The present invention relates to a battery control device, and more particularly, to a battery control device that includes a self-diagnostic function of a battery system.

2. Description of the Related Art

Electric vehicles and plug-in hybrid vehicles (PHV) have become commercially practical and various types of vehicles are introduced on the market. Such vehicles use electric power as a power source. Those vehicles are equipped with an idle stop function so as to improve the rate of fuel consumption. In such vehicles, it is highly important to ensure reliability of a system, that is, reliability of a battery unit including a battery control device. In the battery control device, a self-diagnostic function is performed to keep track of occurrences of abnormalities.

FIG. 1 is a block diagram illustrating a controller (central processing unit (CPU) 110) of a battery system that includes a known self-diagnostic function. FIG. 2 is a flowchart illustrating processing of the self-diagnostic function performed by the CPU 110, and illustrates the processing mainly focusing on processing for detecting abnormalities in a current measuring system.

After a current variation is predetermined with respect to an obtained variation in voltage of a battery V, the CPU 110 detects an abnormality in accordance with the predetermined current variation. Specifically, the CPU 110 starts self-diagnosis of a measuring system (S110). When an ignition 130 is OFF (N at S112), the CPU 110 performs processing for detecting a prescribed variation in voltage (S114). When the CPU 110 detects the prescribed variation in voltage (Y at S114), the CPU 110 performs processing for detecting whether a discharge current is below a prescribed value (S116). When the discharge current is below the prescribed value (Y at S116), the CPU 110 determines that an abnormality has occurred in a current measuring system 120 (S118).

Self-diagnostic techniques have been known that can detect degradation in a secondary battery or abnormalities in a measuring system in such a battery system (refer to Japanese Patent Application Laid-open No. 2010-200574, for example). Specifically, in the technique disclosed in Japanese Patent Application Laid-open No. 2010-200574, the state of charge (SOC) of a secondary battery is calculated by integrating currents detected by a current measuring unit, and open-circuit voltages of the secondary battery at predetermined first and second timings are estimated as first and second open-circuit voltage values on the basis of measured values from a voltage measuring unit and the current measuring unit. Subsequently, first information about the amount of charge/discharge of the secondary battery is obtained on the basis of first and second SOCs at the first and the second timings, second information about the amount of charge/discharge of the secondary battery is obtained on the basis of first and second open-circuit voltage values at the first and the second timings, and whether abnormalities are present in the secondary battery, a voltage detecting unit, and a current detecting unit is determined on the basis of the first and the second information.

The conventional technique illustrated in FIG. 1 and FIG. 2 is based on the premise that a voltage measuring system is normal. As a result, there has been a problem in that, even when it is determined that an abnormality has occurred, the abnormality cannot be distinguished whether it relates to the voltage measuring system or the current measuring system. The same holds true for the technique disclosed in Japanese Patent Application Laid-open No. 2010-200574. Consequently, self-diagnostic processing for detecting abnormalities has been increased, which complicates the processing and also limits the number of timings of the self-diagnostic processing. Thus, an alternative technique has been needed.

SUMMARY OF THE INVENTION

The present invention is made in view of the circumstances described above, and an object thereof is to provide a technique to solve the above problem.

In order to solve the above-mentioned problems, a battery control device according to one aspect of the present invention includes a controller having a self-diagnostic function of a battery system. Herein, the controller determines that an abnormality has occurred, when a vehicle is operated, an engine of the vehicle is stopped, and a discharge current value of a storage battery is equal to or below a prescribed value, based on vehicle operation state information and engine operation information.

Further, in the battery control device according to another aspect of the present invention, it is preferable that the vehicle operation state information is information on whether an ignition is ON.

Further, in the battery control device according to still another aspect of the present invention, it is preferable that the engine operation information is on an engine speed.

Further, in the battery control device according to still another aspect of the present invention, the battery control device is applied to a vehicle equipped with an idle stop function that causes the storage battery mounted on the vehicle to supply electric power to electrical components of the vehicle, during an idle stop state in which the vehicle stops traveling while being operated and the engine is stopped. Herein, the controller determines that, when the ignition is ON and the engine is stopped, the vehicle is in the idle stop state, and also determines that, when a discharge current value of the storage battery is equal to or below a prescribed value, an abnormality has occurred in a current measuring system.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart illustrating processing of the self-diagnostic function performed by the controller (CPU) according to the embodiment.

DETAILED DESCRIPTION OF THE PREFERRED EMBODIMENTS

The following describes an embodiment with reference to the drawings.

Figure 1:
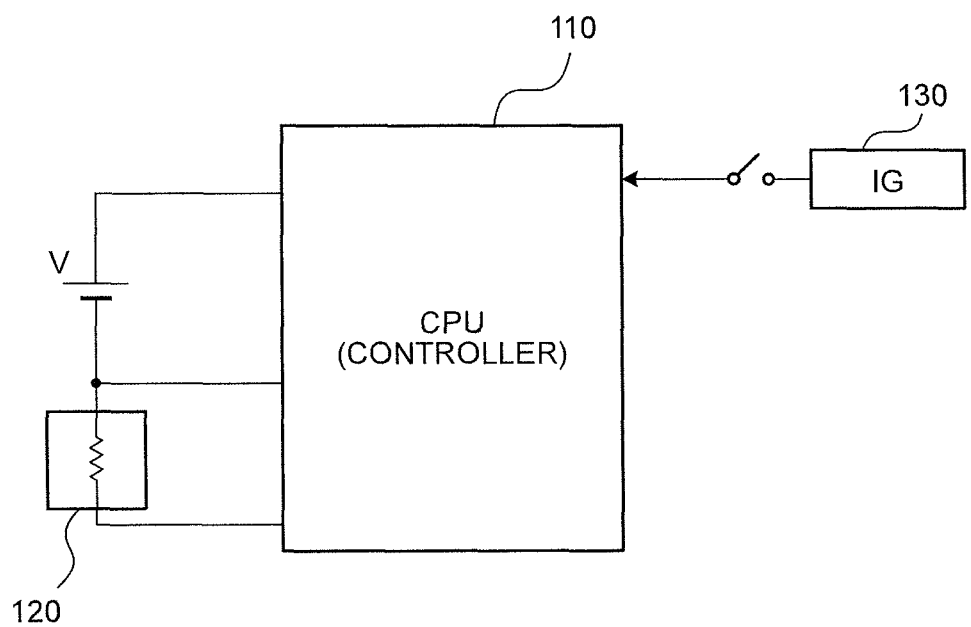
FIG. 1 is a block diagram illustrating a controller of a battery system that includes a self-diagnostic function according to the background.
Figure 2:
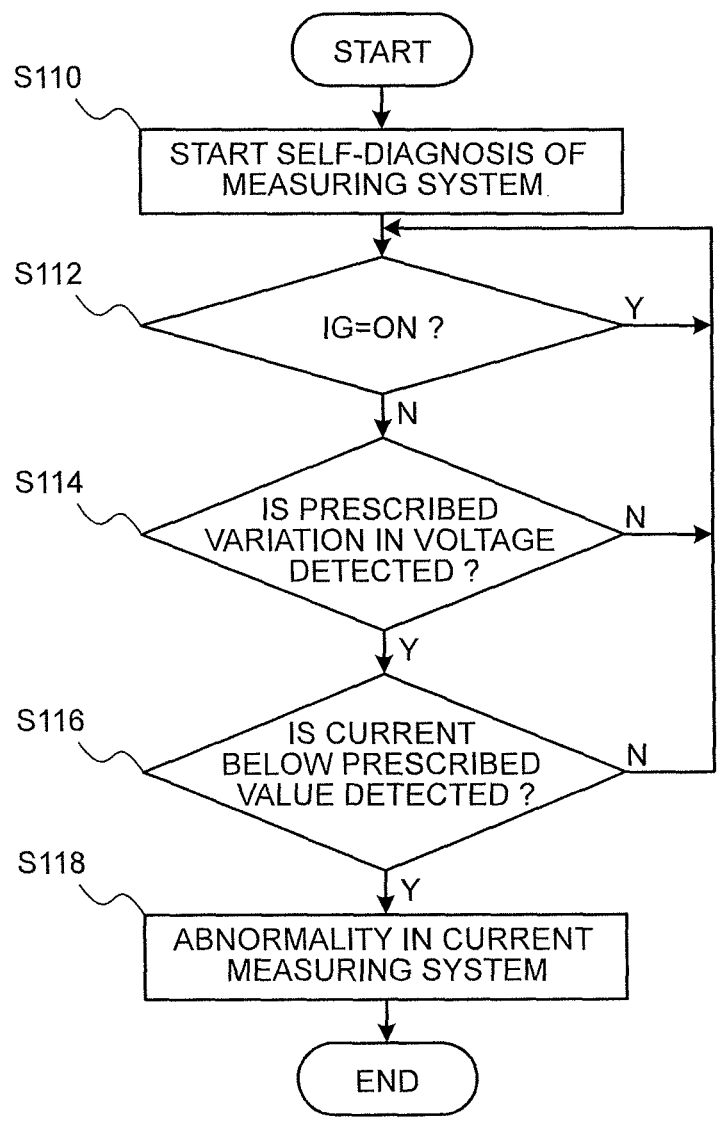
FIG. 2 is a flowchart illustrating processing of the self-diagnostic function performed by the controller (CPU) according to the background.
Figure 3:
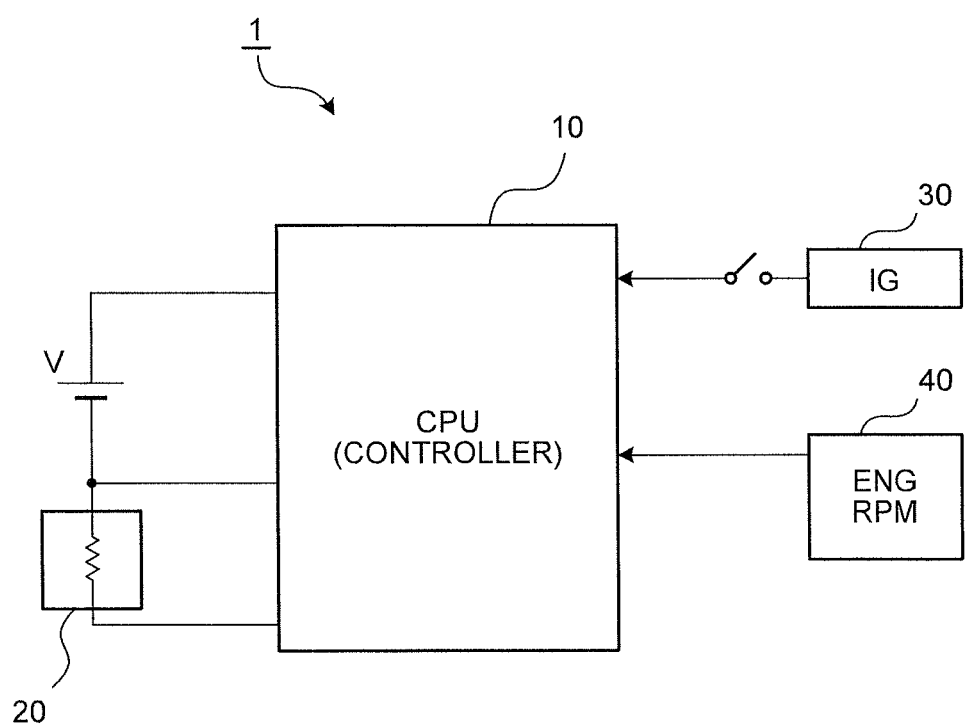
FIG. 3 is a block diagram illustrating a controller of a battery system that includes a self-diagnostic function according to an embodiment.

FIG. 3 is a block diagram illustrating a CPU 10 (microcomputer), which is a controller (battery control device) of a battery system 1 that includes a self-diagnostic function according to the embodiment.

The CPU 10 includes a function of performing self-diagnostic processing (self-diagnostic function) and controls the battery system 1 mounted on a vehicle such as a hybrid vehicle and an electric vehicle. The CPU 10 obtains information on a vehicle operation state (hereinafter, may be referred to as "vehicle operation information") and information on engine operation (hereinafter, may be referred to as "engine operation information"), and also measures battery voltage and a charge/discharge current.

In the self-diagnostic processing performed by the CPU 10 in the embodiment, whether the vehicle is in an idle stop state is determined based on the obtained vehicle operation information and engine operation information in order to perform abnormality detection processing. For a vehicle equipped with an idle stop function, when the vehicle stops traveling while being operated, its engine stops once a certain condition is met. In this state, power (electric power) is supplied from a mounted battery (storage battery) V to electrical components of the vehicle. Thus, currents always flow through the electrical components from the battery V in this state. Consequently, the CPU 10 detects the presence of an abnormality in a measuring system on the basis of a current measurement result obtained by measuring the currents while the vehicle is stationary and an ignition 30 is ON.

FIG. 4 is a flowchart illustrating processing of the self-diagnostic function performed by the CPU 10, and focuses on processing for detecting abnormalities in a current measuring system 20 in particular.

Once the CPU 10 starts the self-diagnostic processing on the measuring system (S10), the CPU 10 determines whether the ignition 30 is ON (S12). When the ignition 30 is ON (Y at S12), the CPU 10 determines whether the engine speed is above zero on the basis of obtained engine speed information (ENGRPM) 40 (S14). In other words, the CPU 10 determines whether the engine is running or stopped.

When the engine speed is equal to or below zero, that is, the engine is stopped (N at S14), the CPU 10 determines that the vehicle is in the idle stop state, and also obtains a current value from the current measuring system 20 and determines whether a discharge current equal to or larger than a prescribed value is flowing (S16). As described above, when the vehicle is in the idle stop state, electric power is supplied to the electrical components of the vehicle, which means that a discharge current larger than the prescribed value needs to be flowing under normal conditions. Thus, when a discharge current larger than the prescribed value is not flowing, that is, the discharge current value is equal to or below the prescribed value (N at S16), the CPU 10 determines that an abnormality has occurred in the current measuring system 20 (S18).

When the ignition 30 is OFF (N at S12), when the engine is running (Y at S14), and when the vehicle is in the idle stop state and a discharge current larger than the prescribed value is flowing, (Y at S16), the processing of the CPU 10 returns to S12.

According to the above embodiment, when a current measurement result indicates that the discharge current value is not larger than the prescribed value, that is, the discharge current value is equal to or below the prescribed value, it can be determined that an abnormality is present in the measuring system. In other words, the presence of an abnormality in the current measuring system can be determined with the simple structure and processing independently of a voltage system. Furthermore, a higher level system can be warned of the result (abnormality) so that the higher level system can appropriately handle the abnormality at an early stage.

The vehicle operation information (information as to whether the ignition 30 is ON) and the engine speed information 40 can be used to increase the number of timings of the self-diagnostic processing and to improve the ability to detect abnormalities.

The present invention can provide a technique that enables processing for detecting abnormalities in a measuring system by using a simple self-diagnostic function in a battery control device capable of detecting the state of a storage battery. From another point of view, the present invention can increase the number of timings of self-diagnostic processing.

Although the present invention has been described above based on the embodiment, the embodiment is presented by way of example. The components and the combination thereof can be modified in various ways, and such modifications are also within the scope of the present invention, as would be understood by those skilled in the art. For example, the single CPU 10 is presented by way of example in the structure for performing the self-diagnostic processing; however, a plurality of CPUs may be properly included in the structure.

What is claimed is:

1. A battery control device comprising a controller having a self-diagnostic function of a battery system, wherein
the controller determines that an abnormality of a measurement system has occurred, when a vehicle is operated, an engine of the vehicle is stopped, and a discharge current value of a storage battery is equal to or below a prescribed value, based on current measurement result when current measurement was performed, based on vehicle operation state information and engine operation information of the vehicle equipped with an idle stop function wherein
the battery control device is applied to a vehicle equipped with an idle stop function that causes the storage battery mounted on the vehicle to supply electric power to electrical components of the vehicle, during an idle stop state in which the vehicle stops traveling while being operated and the engine is stopped, and
the controller determines that, when the ignition is ON and the engine is stopped, the vehicle is in the idle stop state, and also determines that, when a discharge current value of the storage battery is equal to or below a prescribed value, an abnormality has occurred in a current measuring system.

2. The battery control device according to claim 1, wherein
the vehicle operation state information is information on whether an ignition is ON.

3. The battery control device according to claim 1, wherein
the engine operation information is on an engine speed.

4. The battery control device according to claim 2, wherein
the engine operation information is on an engine speed.

5. The battery control device according to claim 1, wherein
the controller determines that the abnormality of the measurement system has occurred, if the discharge current value of the storage battery is equal to or below the prescribed value, as the discharge current which should be flowing in a normal state in an idling stop state is not measured.

* * * * *